United States Patent
Allidieres (10) Patent No.: US 12,224,463 B2
(45) Date of Patent: Feb. 11, 2025

(54) INSTALLATION AND METHOD FOR SUPPLYING A FUEL CELL WITH HYDROGEN

(71) Applicant: L'Air Liquide, Societe Anonyme pour l'Etude et l'Exploitation des Procedes Georges Claude, Paris (FR)

(72) Inventor: Laurent Allidieres, Paris (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 18/413,932

(22) Filed: Jan. 16, 2024

(65) Prior Publication Data

US 2024/0154138 A1    May 9, 2024

Related U.S. Application Data (62) Division of application No. 17/212,680, filed on Mar. 25, 2021, now Pat. No. 11,916,267.

(30) Foreign Application Priority Data

Mar. 25, 2020  (FR) ................................ FR 2002892

(51) Int. Cl.
*H01M 8/04089* (2016.01)
*F17C 13/02* (2006.01)
(Continued)

(52) U.S. Cl.
CPC ....... *H01M 8/04089* (2013.01); *F17C 13/025* (2013.01); *H01M 8/04014* (2013.01);
(Continued)

(58) Field of Classification Search
None
See application file for complete search history.

(56) References Cited

U.S. PATENT DOCUMENTS

| | | |
|---|---|---|
| 2002/0177023 A1 | 11/2002 | Fleck et al. |
| 2006/0199064 A1 | 9/2006 | Gerd et al. |

(Continued)

FOREIGN PATENT DOCUMENTS

| | | | |
|---|---|---|---|
| CN | 108 123 163 | 6/2018 | |
| FR | 3123643 A1 * | 12/2022 | ............ F17C 13/005 |

OTHER PUBLICATIONS

FR 3123643 A1—English Translation (Year: 2022).*
French Search Report for FR 2 002 892, mailed Nov. 18, 2020.

*Primary Examiner* — Timothy L Maust
*Assistant Examiner* — Christopher M Afful
(74) *Attorney, Agent, or Firm* — Justin K. Murray (57) ABSTRACT

An installation for supplying a fuel cell with hydrogen comprising a fuel cell, a liquefied hydrogen storage facility and a supply circuit that includes at least one upstream end connected to the storage facility and one downstream end connected to a fuel inlet of the fuel cell, the supply circuit including at least one system for heating hydrogen by heat exchange with a heat source and a set of control valves, the liquefied hydrogen storage facility being configured to keep the liquefied hydrogen in equilibrium with a gaseous phase at a determined nominal storage pressure of between 1.5 and 4.5 bar, the supply circuit including a buffer tank for pressurized gaseous hydrogen which is configured to store the hydrogen withdrawn from the storage facility and heated by the heating system, the set of valves being configured to accumulate pressurized gas in the buffer tank at a determined storage pressure of between 4 and 100 bar, for example between 6 and 8 bar.

15 Claims, 4 Drawing Sheets

(51) Int. Cl.
*H01M 8/04014* (2016.01)
*H01M 8/04082* (2016.01)
*H01M 8/04746* (2016.01)

(52) U.S. Cl.
CPC ... *H01M 8/04208* (2013.01); *H01M 8/04753* (2013.01); *F17C 2205/0323* (2013.01); *F17C 2227/0302* (2013.01)

(56) References Cited

U.S. PATENT DOCUMENTS

2010/0167155 A1* 7/2010 Kim .................. H01M 8/04201
 429/462
2012/0240599 A1 9/2012 Stolte

* cited by examiner

INSTALLATION AND METHOD FOR SUPPLYING A FUEL CELL WITH HYDROGEN

CROSS-REFERENCE TO RELATED APPLICATIONS

This application is a divisional application of U.S. application Ser. No. 17/212,680, mailed Mar. 25, 2021, which claims the benefit of priority under 35 U.S.C. § 119 (a) and (b) to French patent application No. FR 2 002 892, filed Mar. 25, 2020, the entire contents of which are incorporated herein by reference.

BACKGROUND

Field of the Invention

The invention relates to an installation and a method for supplying a fuel cell with hydrogen.

The invention relates more particularly to an installation for supplying a fuel cell with hydrogen, the installation comprising a fuel cell, a liquefied hydrogen storage facility and a supply circuit comprising at least one upstream end connected to the storage facility and one downstream end connected to a fuel inlet of the fuel cell, the supply circuit comprising at least one system for heating hydrogen by heat exchange with a heat source and a set of control valves, the liquefied hydrogen storage facility being configured to keep the liquefied hydrogen in equilibrium with a gaseous phase at a determined nominal storage pressure of between 1.5 and 4.5 bar.

Related Art

Fuel cells operate with a hydrogen pressure at the anode of a few hundred millibar. However, fuel cell manufacturers in most cases specify pressures of the order of 5 bar to 10 bar at their supply limit. This makes it possible to provide this pressure level downstream of the last expansion stage before the inlet of the anode. This pressure upstream of the cell inlet makes it possible to have a gas reservoir (or pressurized gas reserve) for managing the shutdown of the cell in the event of unexpected stopping of the hydrogen supply. This is because, if the supply of hydrogen is abruptly stopped while the power demand is still present, without this pressurized hydrogen reserve, the hydrogen present at the anode would be consumed which would lead to a negative relative pressure at this interface. This can damage the electrode membrane assembly of the cell (by inversion of the pressure with respect to the cathode and potentially placing the anode under a vacuum).

In the case of feeding hydrogen with pressurized gas storage facilities (350/700 bar), there is often a lower limit of operation of the tanks which is fixed between 10 and 20 bar (for example in order to avoid damaging the composite structure of the type 4 tanks with polymer liner, or to avoid reaching a pressure which is too close to atmospheric pressure in the tank, which would favour entry of humidity or of air). This low pressure level is compatible with the abovementioned reserve specification of 5 to 10 bar.

In other configurations, the hydrogen is provided by a liquid hydrogen cryogenic storage facility.

Liquid hydrogen storage facilities are generally kept at a relatively low pressure for a number of reasons. Such a tank naturally self-pressurizes via the thermal inputs (insulation, pipelines, supports) when no flow of product is withdrawn. There is therefore interest in storing the fluid at the lowest possible pressure in order to maintain the greatest possible difference in pressure between the operating pressure and the set pressure of the valve; specifically, this makes it possible to increase the endurance of the storage facility (increased duration before an overpressure valve opens).

In addition, liquid hydrogen expands as its liquid/gas saturation pressure increases. A gas headspace of the order of 5% (in moles) should be maintained at the opening of the valve. Thus, the more elevated the pressure of a valve opening in a storage facility, the less it can be filled at its (relatively low) filling pressure.

Lastly, the latent heat of vaporization of the hydrogen decreases as a function of the liquid/vapour saturation pressure. Since the rate of increase in pressure in the self-pressurization phase is inversely proportional to this latent heat, the pressure of a cryogenic storage facility increases all the faster when this pressure is high (convex curve of the rise in self-pressurization).

In the case where fuel cells are operated at high pressure (for example at 6 bar) and where the hydrogen tank which feeds the cell is a low-pressure (for example 2.5 bar abs.) liquid storage facility, it is necessary to self-pressurize the storage facility prior to starting up the cell. This self-pressurization may consist in removing liquid from the storage facility and evaporating and reinjecting it into the gaseous phase of the storage facility. This leads to a deviation from the thermodynamic equilibrium of the storage facility via a temperature stratification of the gas headspace.

If the tank is installed on board a train or boat, the gas headspace will condense upon the first shock (or wave) and the tank will return to its equilibrium pressure, which might be located below the minimum operating pressure of the fuel cell. In this configuration, in order to guarantee optimum operation of the cells, it is theoretically necessary to arrange two liquid buffer tanks which are kept saturated between the main tank and the fuel cell. One tank is filled and pressurized while the other feeds the fuel cell. The tank has a volume sufficient for the pressurized tank to be at its equilibrium pressure when it is connected to the cell. Such a device makes it possible to feed the cell with hydrogen at a sufficient pressure. This has the disadvantage of requiring two additional cryogenic tanks and a higher hydrogen consumption, since the empty intermediate tank must be filled and hot and at high pressure and must be cooled and depressurized in order to be refilled with liquid hydrogen.

A specification of the hydrogen at 5 bar for a fuel cell use from a liquid storage facility thus penalizes the filling level of the storage facility and its endurance.

For all of these reasons, there is instead interest in limiting the operating pressure of the hydrogen at the outlet of the storage facility to a pressure of the order of 2.5 to 3.5 bar abs., far below the 5 bar specified by the fuel cell manufacturers.

SUMMARY OF THE INVENTION

One aim of the present invention is to overcome all or some of the disadvantages of the prior art noted above.

To this end, the installation according to the invention, moreover in accordance with the generic definition given for it in the preamble above, is essentially characterized in that the supply circuit includes a buffer tank for pressurized gaseous hydrogen which is configured to store the hydrogen withdrawn from the storage facility and heated by the heating system, the set of valves being configured to accumulate pressurized gas in the buffer tank at a determined storage pressure of between 4 and 100 bar, for example between 6 and 8 bar.

The invention thus makes it possible to operate a liquid hydrogen storage facility at relatively low pressure while maintaining a reserve of hydrogen at higher pressure which is necessary in order to be able to ensure safe shutdown of the fuel cell in the event of an unexpected shutoff of the feed from the liquid storage facility.

This reserve of pressurized gaseous hydrogen can be automatically regenerated during the various life stages of the liquid storage facility, in particular during the self-pressurization phases, that is to say when the cell is shutdown and the pressure of the storage facility increases naturally due to the inputs of heat.

Furthermore, embodiments of the invention can comprise one or more of the following features:

the supply circuit comprises a liquid withdrawal pipe connecting the lower portion of the storage facility to the fuel inlet of the fuel cell, the liquid withdrawal pipe comprising, arranged in series: a first heating heat exchanger, and a first pressure- and/or flow rate-regulator, said first pressure- and/or flow rate-regulating valve being configured to feed the fuel inlet of the fuel cell at a determined operating pressure of between 1 and 3 bar, the circuit comprises a gas withdrawal pipe connecting the upper portion of the storage facility to an inlet of the buffer tank, the gas withdrawal pipe comprises, arranged in series: a heat exchanger for heating gaseous hydrogen, and a pressure- and/or flow rate-regulating valve, said pressure- and/or flow rate-regulating valve being configured to transfer gas at the storage pressure into the buffer tank, the pressure- and/or flow rate-regulating valve is configured to automatically transfer gas from the storage facility to the buffer tank only when the pressure in the storage facility exceeds a determined pressure threshold, the circuit comprises a gas filling pipe having an upstream end connected to an outlet of the first heating heat exchanger and a downstream end connected to an inlet of the buffer tank, the gas filling pipe comprising a pressure- and/or flow rate-regulating valve, said pressure and/or flow rate regulator being configured to transfer gas at the storage pressure into the buffer tank, the circuit comprises a liquid removal pipe having an upstream end connected to the lower portion of the storage facility and a downstream end connected to an inlet of the buffer tank, the circuit comprises a set of isolation valves arranged at the inlet and at the outlet of the buffer storage facility, the hydrogen heating system comprising an exchange of heat between the fluid contained in the buffer storage facility and a heat source such as the atmosphere for vaporizing and increasing the pressure of the fluid in the buffer tank when the isolation valves are closed, the circuit furthermore comprising an element for limiting the pressure in said buffer storage facility such as a discharge valve which opens above a determined pressure threshold, the supply circuit comprises a backup feed pipe connecting an outlet of the buffer tank to the fuel inlet of the fuel cell, the backup feed pipe comprising at least one pressure- and/or flow rate-regulating valve configured to provide gas at a determined pressure to the cell, the backup feed pipe comprises, arranged in series with the at least one pressure—and/or flow rate-regulating valve: a valve shutter, a heating heat exchanger, and a pressure-sensitive safety valve for discharging the gas to the outside of the circuit in the event of pressure above a safety threshold, the backup feed pipe is connected to the fuel inlet of the fuel cell via a connection to a portion of the liquid withdrawal pipe.

The invention also relates to a method for supplying a fuel cell with hydrogen using an installation according to any one of the features above or below, wherein the fuel cell is fed with hydrogen by the storage facility, the method comprising a step of transferring hydrogen from the storage facility to the buffer tank.

According to other possible distinguishing features:

the step of transferring hydrogen from the storage facility to the buffer tank is performed during an interruption to the feeding of the cell with hydrogen by the storage facility, in particular during a shutdown of the fuel cell, the method includes, during the operation of the fuel cell, a step of detecting a fault in the feeding of the fuel cell with hydrogen by the storage facility and, in response, a step of backup feeding in which the fuel cell is fed with hydrogen by the buffer tank.

The invention may also relate to any alternative device or method comprising any combination of the features above or below within the scope of the claims.

BRIEF DESCRIPTION OF THE FIGURES

Other distinctive features and advantages will become apparent on reading the description below, which is made with reference to the figures, in which.

DETAILED DESCRIPTION OF THE INVENTION

The installation 1 for supplying a fuel cell with hydrogen comprises a fuel cell 2, a liquefied hydrogen storage facility 3 and a supply circuit 4, 14 comprising at least one upstream end connected to the storage facility 3 and one downstream end connected to a fuel inlet of the fuel cell 2.

The supply circuit 4, 14 comprises at least one system 5, 15 for heating hydrogen by heat exchange with a heat source and a set of control valves 6, 16, 26.

The liquefied hydrogen storage facility 3 is configured to keep the liquefied hydrogen in equilibrium with a gaseous phase at a relatively low determined nominal storage pressure of for example between 1.5 and 4.5 bar.

The supply circuit 4, 14 includes a buffer tank 7 for pressurized gaseous hydrogen which is configured to store the hydrogen withdrawn from the storage facility 3 and heated by the heating system 5, 15. The set of valves is configured to accumulate pressurized gas in the buffer tank 7 at a relatively high determined storage pressure of between 4 and 100 bar, for example between 6 and 8 bar.

The supply circuit comprises a liquid withdrawal pipe 4 connecting the lower portion of the storage facility 3 to the fuel inlet of the fuel cell 2.

The liquid withdrawal pipe 4 comprises, arranged in series: a first heating heat exchanger 5 (or evaporator) and a first pressure- and/or flow rate-regulating valve 6. This first pressure- and/or flow rate-regulating valve 6 is configured to feed the fuel inlet of the fuel cell 2 at a determined operating pressure of for example between 1 and 3 bar abs. This feeding with hydrogen from the liquid storage facility 3 constitutes what is called normal operation, when the fuel cell 2 is in an operating state.

Figure 1:
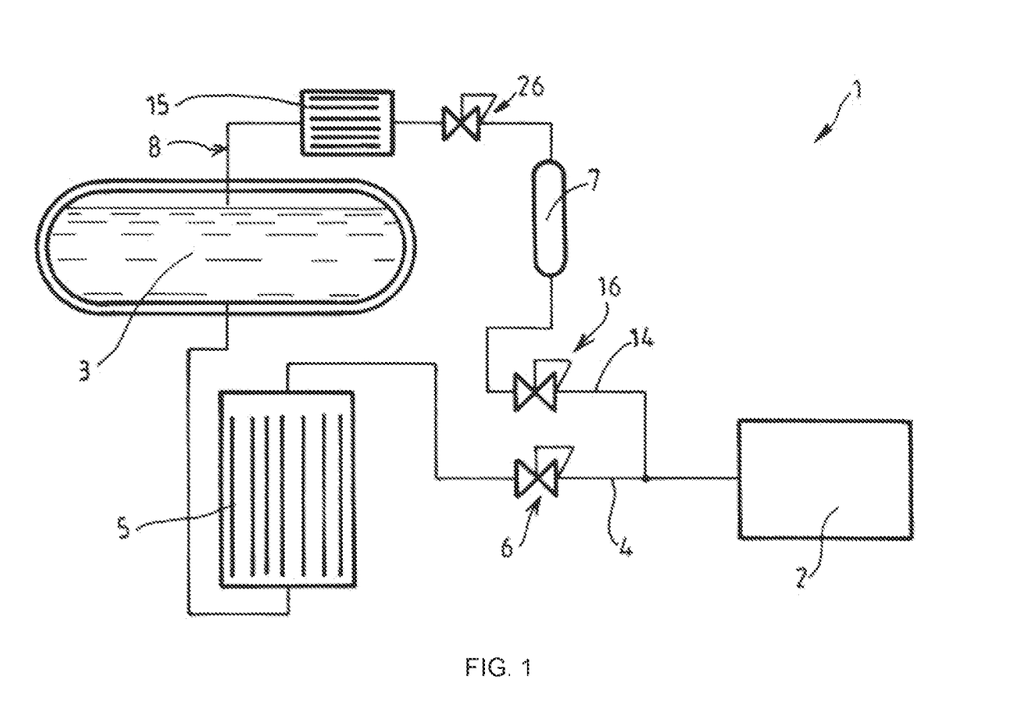
FIG. 1 represents a diagrammatic and partial view illustrating the structure and the operation of a first implementational example of an installation according to the invention.

In the embodiment of FIG. 1, the circuit comprises a gas withdrawal pipe 8 connecting the upper portion of the storage facility 3 to an inlet of the buffer tank 7. The gas withdrawal pipe 8 comprises, arranged in series: a second heat exchanger 15 for heating gaseous hydrogen and a second pressure- and/or flow rate-regulating valve 26. The second heat exchanger 15 is for example an atmospheric heater which brings the removed gaseous hydrogen to a temperature of 22 K to 100 K.

The second pressure- and/or flow rate-regulating valve 26 is for its part configured to transfer gas at the storage pressure, for example between 5 and 8 bar, into the buffer tank 7.

The second pressure- and/or flow rate-regulating valve 26 (and/or an appropriate valve shutter system (not shown), for example at least one non-return valve) may be configured to automatically transfer pressurized gas from the storage facility 3 to the buffer tank 7, preferably only when the pressure in the storage facility 3 exceeds a determined pressure threshold.

This is because, in particular in the phases in which the fuel cell 2 is not fed by the storage facility 3 for relatively long periods, the storage facility 3 has a tendency to self-pressurize. Its internal pressure can in particular reach thresholds of greater than 5 bar. This pressure decreases as soon as hydrogen is withdrawn in the gas headspace.

Figure 2:
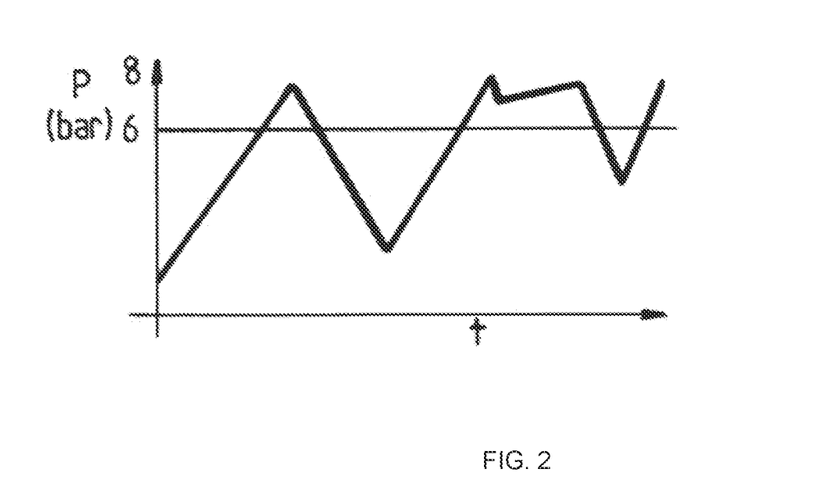
FIG. 2 represents a diagrammatic and partial view illustrating an example of variations in a possible pressure within the cryogenic storage facility of the installation.

FIG. 2 illustrates an example of variations in pressure P (in bar) in the storage facility 3 as a function of time t. As illustrated, the pressure can describe rising gradients in the case of self-pressurization, for example, and falling gradients (in the case of withdrawal, for example). The second regulation valve 26 can for example be configured (regulated, dimensioned, calibrated or controlled) so as to open when the upstream pressure is greater than an opening threshold (for example 6 bar) and to close again when the upstream pressure is less than this opening threshold (or another pressure threshold).

This makes it possible to transfer, preferably automatically, gas from the storage facility 3 to the buffer tank 7, preferably only when the pressure in the storage facility 3 exceeds a determined pressure threshold.

Figure 3:
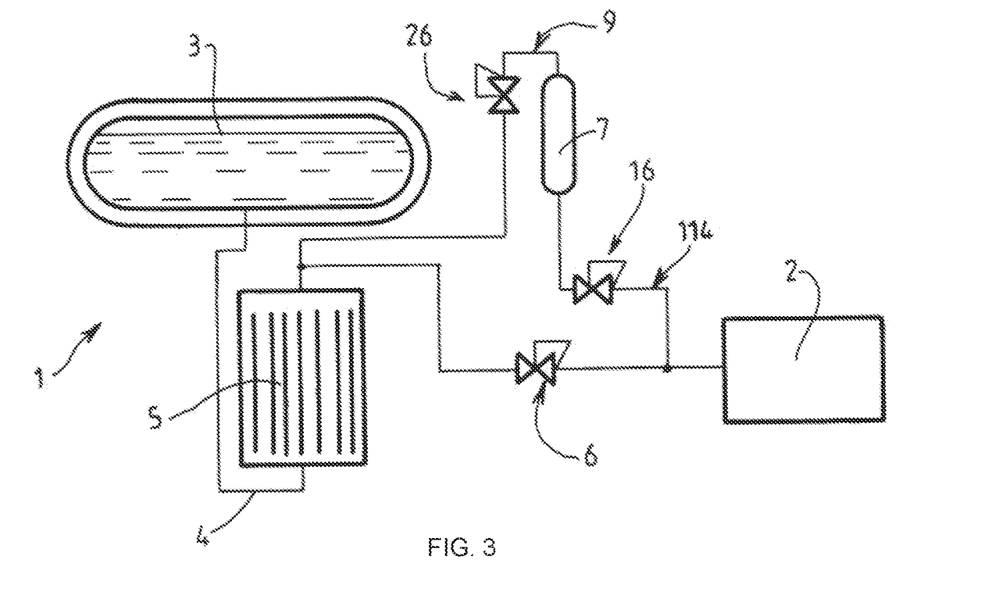
FIG. 3 represents a diagrammatic and partial view illustrating the structure and the operation of a second implementational example of an installation according to the invention.

In the embodiment of FIG. 3, the circuit comprises a gas filling pipe 9 having an upstream end connected to an outlet of the first heating heat exchanger 5 and a downstream end connected to an inlet of the buffer tank 7. This gas filling pipe 9 comprises a second pressure- and/or flow rate-regulating valve 26, said second pressure- and/or flow rate-regulating valve 26 being configured to transfer gas at the storage pressure into the buffer tank 7 after said gas has passed through the first heating heat exchanger 5.

In other words, the filling of the buffer tank 7 can be controlled by an expansion device 26 on a diversion line of the liquid withdrawal pipe 4, downstream of the first heating heat exchanger 5.

This expansion device 26 (or an equivalent valve or valve shutter, cf. below) can be activated in particular when the feeding of hydrogen to the fuel cell 2 is shut off. In this case, the feeding of the fuel cell 2 with gaseous hydrogen can be performed by the buffer tank 7 via a downstream third pressure- and/or flow rate-regulating valve 16 (the outlet of which can be connected to the downstream portion of the liquid withdrawal pipe 4 which is connected to the fuel inlet of the fuel cell 2).

Figure 4:
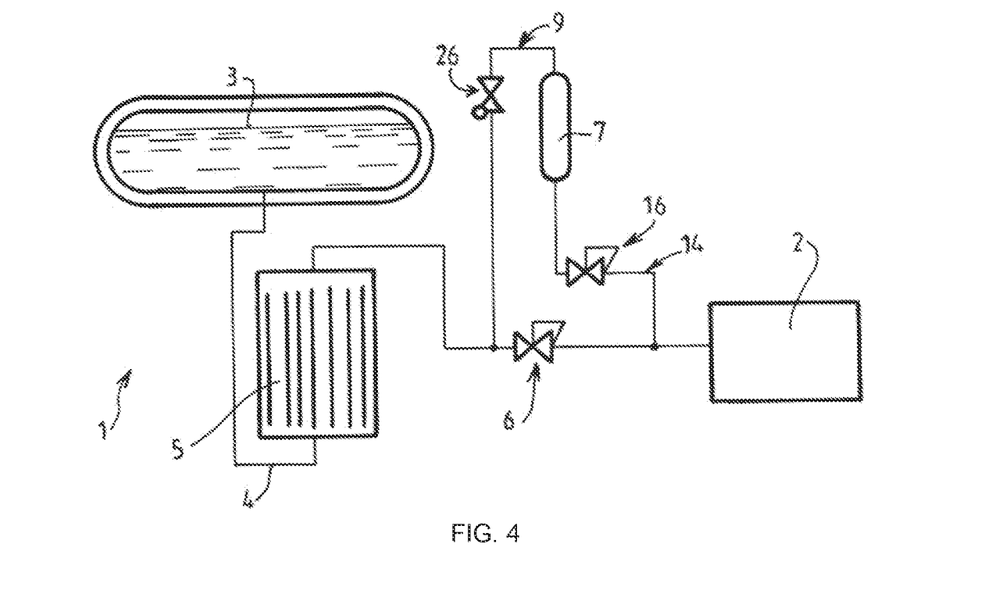
FIG. 4 represents a diagrammatic and partial view illustrating the structure and the operation of a third implementational example of an installation according to the invention.

The embodiment of FIG. 4 differs from that of FIG. 3 in that the expansion device 26 is replaced by a simple valve or valve shutter. It should be noted that, just as in the embodiment of FIG. 3, the inlet of the buffer tank 7 could be connected to the upper portion of the storage facility 3 in order to recover the vaporization gas (instead of the gas obtained from the vaporization of the liquid in the heat exchanger 5).

Figure 5:
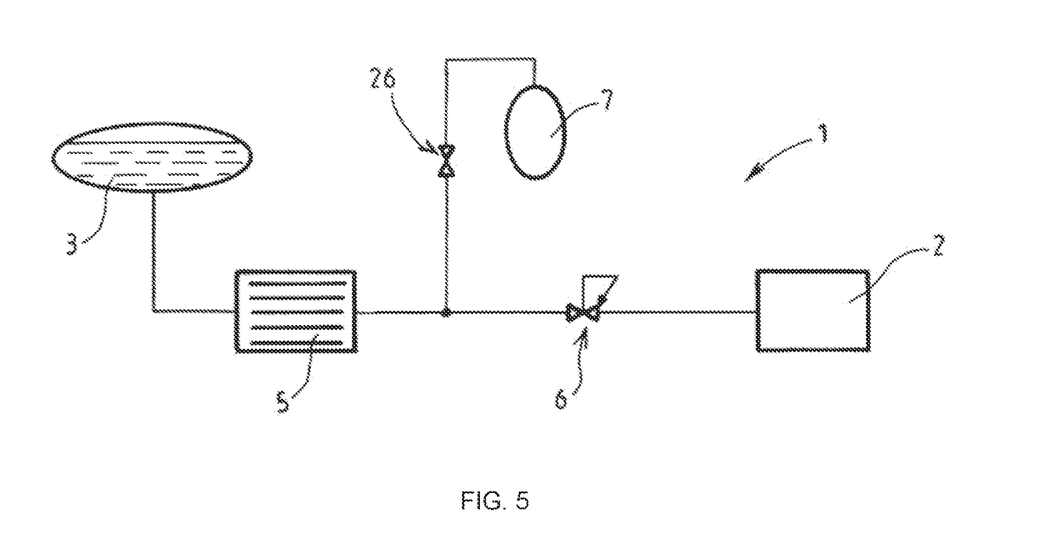
FIG. 5 represents a diagrammatic and partial view illustrating the structure and the operation of a fourth implementational example of an installation according to the invention.

The embodiment of FIG. 5 differs from that of FIG. 3 in that the inlet and the outlet of the buffer tank 7 have been combined. The filling of the buffer tank 7 or the withdrawal of gas from the buffer tank 7 are controlled by a second regulation valve or valve shutter connected to the liquid withdrawal pipe 4, for example downstream of the first heating heat exchanger 5 and upstream of the first pressure- and/or flow rate-regulating valve 6.

The filling of the buffer tank 7 may in particular be controlled by the second valve 26 which can be automatically opened as soon as the pressure in the storage facility 3 is greater than a high threshold. This second valve 26 may also be automatically opened when the normal feeding of the fuel cell 2 with hydrogen is shut off (for example due to a lack of liquid in the storage facility).

Figure 6:
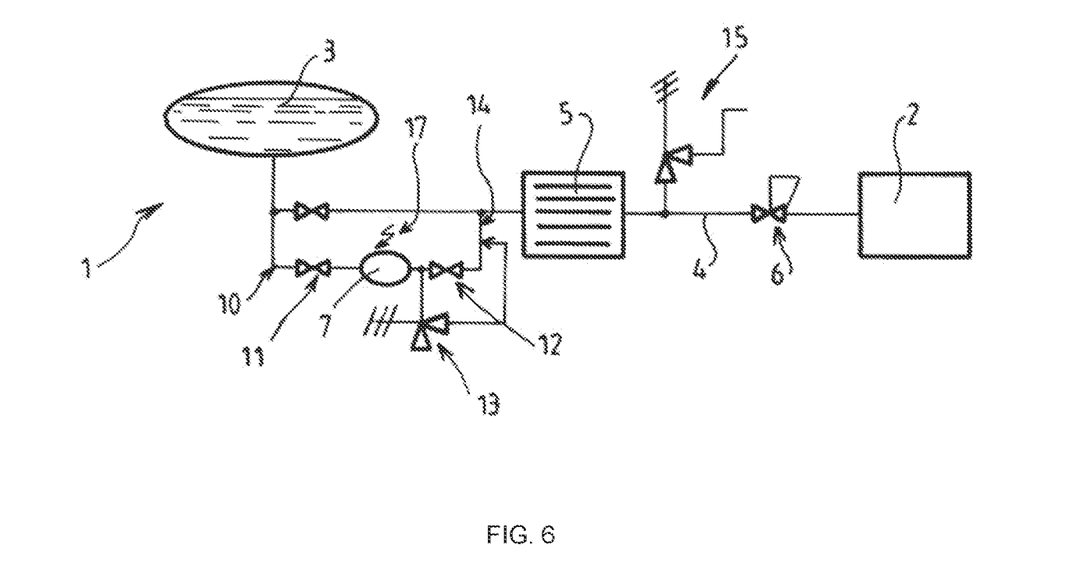
FIG. 6 represents a diagrammatic and partial view illustrating the structure and the operation of a fifth implementational example of an installation according to the invention.

In the embodiment of FIG. 6, the circuit comprises a liquid removal pipe 10 having an upstream end connected to the lower portion of the storage facility 3 and a downstream end connected to an inlet of the buffer tank 7. As illustrated, this liquid removal pipe 10 can be a diversion of the upstream portion of the liquid withdrawal pipe 4.

In this embodiment, the circuit comprises a set of isolation valves 11, 12 arranged at the inlet and at the outlet of the buffer storage facility 7. A possible heating of the hydrogen comprises an exchange of heat between the fluid contained in the buffer storage facility 7 and a heat source such as the atmosphere for vaporizing and increasing the pressure of the fluid in the buffer tank 7 when the isolation valves 11, 12 are closed and trap the fluid in the buffer tank 7. Moreover, the circuit preferably additionally comprises an element 13 for limiting the pressure in said buffer storage facility 7 such as a discharge valve connected to the tank 7 and opening above a determined pressure threshold.

In this configuration, the buffer tank 7 can thus be filled with cryogenic liquid upstream of the first heating heat exchanger 5 via the opening of the upstream isolation valve 11 (and possibly the downstream isolation valve 12). When the buffer tank 7 is filled and preferably cold (temperature for example of between 25 and 150 K), the isolation valves 11, 12 can be closed. The trapped liquid will evaporate due to the heat inputs (possibly also via active heating); the pressure increases in the buffer tank 7. Any possible overpressure can be discharged via the discharge valve 13 (which can remain closed during filling of the buffer tank 17 at constant pressure). The pressure in the buffer tank 7 is for example brought to a value between 6 and 100 bar and thus constitutes a reserve of pressurized hydrogen for feeding the fuel cell 2 in the event of failure of the normal feed (for example via the opening of the downstream isolation valve 12).

Figure 7:
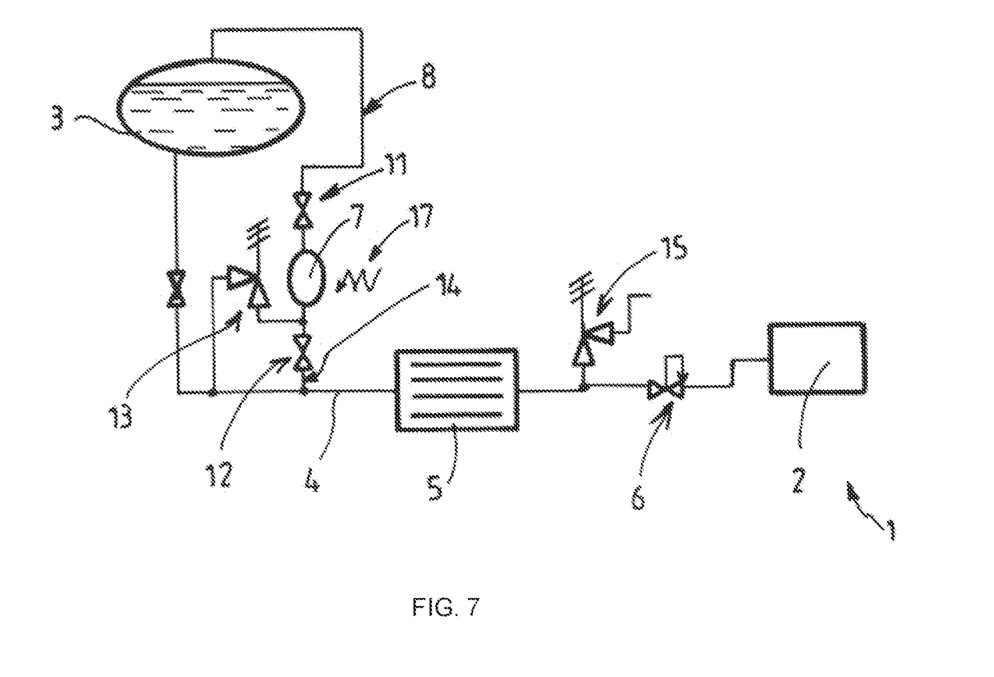
FIG. 7 represents a diagrammatic and partial view illustrating the structure and the operation of a sixth implementational example of an installation according to the invention.

The embodiment of FIG. 7 differs from that of FIG. 6 in that the inlet of the buffer tank 7 is connected to the upper portion of the storage facility 3 via a gas withdrawal pipe 8.

The filling of the buffer tank 7 can thus be performed upstream of the first heating heat exchanger 5 by opening the upstream isolation valve 11 and possibly the second isolation valve 12. The buffer tank 7 is filled with cold gas from the storage facility 3. The rest of the process can be identical to that described above in relation with FIG. 6.

Thus, in the normal configuration the storage facility 3 can be maintained at a relatively low pressure (less than 5 bar for example) and feeds the fuel cell 2 at a pressure of between 1 and 5 bar via evaporation and regulation of pressure. A possible and temporary overpressure in the storage facility 3 can be used to fill the buffer tank 7 at a higher pressure (5 bar or more for example). This pressurized gas reserve 7 is usable for feeding the fuel cell 2 with hydrogen if the normal feed is unavailable. In the configurations of FIG. 6 and FIG. 7, the pressure in the buffer tank 7 can be brought up to more than 200 bar by simple heating of the cold gas/liquid trapped in the tank 7 while the valves 11 and 12 are closed.

This makes it possible to continue to feed the fuel cell 2 for example for the time it takes for the pressurization system of the storage facility 3 to re-establish the nominal operating pressure of the hydrogen.

The installation may thus take advantage of the self-pressurization (inactivated cell) use phases of the storage facility 3 during which the pressure in the storage facility 3 may rise to a pressure greater than 5 bar for filling a buffer tank 7.

As illustrated in the non-limiting examples, the hydrogen used to fill the buffer tank 7 may be removed directly at the gas headspace (upper portion of the storage facility), upstream and/or downstream of the heating heat exchanger(s) 5, 15.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An installation for supplying a fuel cell with hydrogen, the installation comprising:
    the fuel cell;
    a liquefied hydrogen storage tank; and
    a supply circuit comprising at least one upstream end connected to the liquefied storage tank and one downstream end connected to a fuel inlet of the fuel cell, the supply circuit comprising: a set of control valves and a hydrogen heating system configured to heat hydrogen by heat exchange with a heat source, wherein the hydrogen heating system comprises a first heating heat exchanger, wherein the liquefied hydrogen storage tank is configured to keep the liquefied hydrogen in equilibrium with a gaseous phase at a determined nominal storage pressure of between 1.5 and 4.5 bar,
    wherein the supply circuit further comprises a liquid withdrawal pipe and a buffer tank for pressurized gaseous hydrogen that is configured to store the hydrogen withdrawn from the liquefied hydrogen storage tank and heated by the hydrogen heating system,
    wherein the set of control valves is configured to accumulate pressurized gas in the buffer tank at a determined storage pressure of between 4 and 100 bar,
    wherein the liquid withdrawal pipe connects a lower portion of the liquefied hydrogen storage tank to the fuel inlet of the fuel cell, the liquid withdrawal pipe comprising, arranged in series, the first heating heat exchanger and a first pressure- and/or flow rate-regulating valve, said first pressure- and/or flow rate-regulating valve being configured to feed the fuel inlet of the fuel cell at a determined operating pressure of between 1 and 3 bar, wherein the fuel cell is fed with hydrogen by the liquefied hydrogen storage tank.

2. The installation of claim 1, wherein the supply circuit further comprises a gas withdrawal pipe connecting an upper portion of the liquefied hydrogen storage tank to an inlet of the buffer tank.

3. The installation of claim 2, wherein the hydrogen heating system further comprises a second heating heat exchanger that is in fluid communication with the gas withdrawal pipe and is configured to heat gaseous hydrogen, wherein the gas withdrawal pipe comprises, arranged in series, the second heating heat exchanger and a second pressure- and/or flow rate-regulating valve, said second pressure- and/or flow rate-regulating valve being configured to transfer gas at the storage pressure into the buffer tank.

4. The installation of claim 3, wherein the second pressure- and/or flow rate-regulating valve is configured to automatically transfer gas from the liquefied hydrogen storage tank to the buffer tank only when the pressure in the liquefied hydrogen storage tank exceeds a determined pressure threshold.

5. The installation of claim 2, wherein the supply circuit further comprises a set of isolation valves arranged at the inlet and the outlet of the buffer liquefied hydrogen storage tank, the hydrogen heating system comprising an exchange of heat between the fluid contained in the buffer tank and a heat source such as the atmosphere for vaporizing and increasing the pressure of the fluid in the buffer tank when the isolation valves are closed, the supply circuit furthermore comprising an element for limiting the pressure in said buffer tank such as a discharge valve which opens above a determined pressure threshold.

6. The installation of claim 5, wherein the heat source is the atmosphere.

7. The installation of claim 5, wherein the supply circuit further comprises a backup feed pipe connecting an outlet of the buffer tank to the fuel inlet of the fuel cell, the backup feed pipe comprising at least one fourth pressure- and/or flow rate-regulating valve configured to provide gas at a determined pressure to the fuel cell and, arranged in series, a valve shutter, the first heating heat exchanger, and a pressure-sensitive safety valve for discharging the gas to the outside of the supply circuit in the event of pressure above a safety threshold.

8. The installation of claim 1, wherein the supply circuit further comprises a gas filling pipe having an upstream end connected to an outlet of the first heating heat exchanger and a downstream end connected to an inlet of the buffer tank, the gas filling pipe comprising a third pressure- and/or flow rate-regulating valve, said third pressure and/or flow rate regulator being configured to transfer gas at the storage pressure into the buffer tank.

9. The installation of claim 1, wherein the supply circuit further comprises a liquid removal pipe having an upstream end connected to the lower portion of the liquefied hydrogen storage tank and a downstream end connected to an inlet of the buffer tank.

10. The installation of claim 1, wherein the supply circuit further comprises a backup feed pipe connecting an outlet of the buffer tank to the fuel inlet of the fuel cell, the backup feed pipe comprising at least one fourth pressure- and/or flow rate-regulating valve configured to provide gas at a determined pressure to the fuel cell.

11. The installation of claim 10, wherein the backup feed pipe is connected to the fuel inlet of the fuel cell via a connection to a portion of the liquid withdrawal pipe.

12. The installation of claim 1, wherein the set of control valves is configured to accumulate pressurized gas in the buffer tank at a determined storage pressure of between 6 and 8 bar.

13. The installation of claim 1, wherein the heating system can be selected from the group consisting of the first heating heat exchanger, a second heating heat exchanger, and combinations thereof.

14. The installation of claim 1, wherein the installation is disposed onboard a vehicle.

15. The installation of claim 14, wherein the vehicle is selected from the group consisting of a boat and a train.

* * * * *